(12) United States Patent
Park et al.

(10) Patent No.: US 9,075,785 B2
(45) Date of Patent: Jul. 7, 2015

(54) APPARATUS AND METHOD FOR SHARING COMMENT IN MOBILE COMMUNICATION TERMINAL

(75) Inventors: Mi-Hwa Park, Anyang-si (KR); Jin-Guk Jeong, Yongin-si (KR); Sun-Hee Youm, Seoul (KR); Soo-Hong Park, Yongin-si (KR); Min-Ho Lee, Gwacheon-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 58 days.

(21) Appl. No.: 13/411,410

(22) Filed: Mar. 2, 2012

(65) Prior Publication Data

US 2012/0226996 A1    Sep. 6, 2012

(30) Foreign Application Priority Data

Mar. 2, 2011  (KR) .......................... 10-2011-0018293

(51) Int. Cl.
   *G06F 3/00*    (2006.01)
   *G06F 17/24*   (2006.01)
   *G06F 17/30*   (2006.01)

(52) U.S. Cl.
   CPC ........ *G06F 17/241* (2013.01); *G06F 17/30876* (2013.01)

(58) Field of Classification Search
   CPC ....................................................... G06F 17/30
   USPC ......................................................... 715/748
   See application file for complete search history.

(56) References Cited

U.S. PATENT DOCUMENTS

| | | | |
|---|---|---|---|
| 2002/0120634 A1* | 8/2002 | Min et al. ....................... | 707/200 |
| 2004/0068521 A1* | 4/2004 | Haacke et al. ................. | 707/200 |
| 2006/0242178 A1  | 10/2006 | Butterfield et al. | |
| 2007/0115256 A1* | 5/2007 | Lee et al. ....................... | 345/156 |
| 2007/0260677 A1* | 11/2007 | DeMarco et al. ............... | 709/203 |
| 2008/0240671 A1* | 10/2008 | Yamasaki et al. ............... | 386/52 |
| 2009/0034784 A1* | 2/2009 | McQuaide, Jr. ............... | 382/100 |
| 2009/0164904 A1* | 6/2009 | Horowitz et al. ............. | 715/723 |
| 2010/0095211 A1* | 4/2010 | Kenvin et al. ................. | 715/723 |
| 2010/0122309 A1* | 5/2010 | Kawakami et al. ........... | 725/116 |
| 2010/0199182 A1* | 8/2010 | Lanza et al. ................... | 715/723 |
| 2010/0269130 A1* | 10/2010 | Gupta ............................. | 725/28 |
| 2012/0110473 A1* | 5/2012 | Tseng ........................... | 715/753 |
| 2012/0151346 A1* | 6/2012 | McClements, IV .......... | 715/716 |
| 2012/0166964 A1* | 6/2012 | Tseng ........................... | 715/745 |

FOREIGN PATENT DOCUMENTS

JP    2008-283409    11/2008

OTHER PUBLICATIONS

International Search Report dated Sep. 27, 2012 in connection with International Patent Application No. PCT/KR2012/001344.
Written Opinion of the International Searching Authority dated Sep. 27, 2012 in connection with International Patent Application No. PCT/KR2012/001344.

* cited by examiner

*Primary Examiner* — Kieu Vu
*Assistant Examiner* — Andrew Chung

(57) ABSTRACT

An apparatus and a method share a comment related to contents in a mobile communication terminal. In the method, a comment regarding a contents file that is being reproduced is received. A comment Uniform Resource Locator (URL) is read from a metadata storage space of the contents file. The comment regarding the contents file is stored in a storage space of the comment URL.

20 Claims, 7 Drawing Sheets

COMMENT LIST 1. 00:02:11 HYUNBIN'S HOME
   LUXURY HOUSE
   VERY BEAUTIFUL 2. 00:10:11 HA JI-WON'S HOME
   ROOFTOP HOUSE 3. 00:20:11 HYUNBIN'S CAR, BMW
   OPEN CAR IS CHILLY

SECRET GARDEN

FIG.7

APPARATUS AND METHOD FOR SHARING COMMENT IN MOBILE COMMUNICATION TERMINAL

CROSS-REFERENCE TO RELATED APPLICATION(S) AND CLAIM OF PRIORITY

This application claims the benefit under 35 U.S.C. §119 (a) of a Korean patent application filed in the Korean Intellectual Property Office on Mar. 2, 2011 and assigned Serial No. 10-2011-0018293, the entire disclosure of which is hereby incorporated by reference.

TECHNICAL FIELD OF THE INVENTION

The present invention relates to a mobile communication terminal. More particularly, the present invention relates to an apparatus and a method for sharing a comment related to contents in a mobile communication terminal.

BACKGROUND OF THE INVENTION

Recently, a system where a plurality of unspecified people upload contents such as text, an image, a moving picture, etc. via a cyber space such as the Internet, and open the contents to other people so that various contents are shared, is widely used.

In addition, a service where a different user posts comments on contents posted by a specific user, so that one's opinion related to the relevant contents may be shared, is widely distributed and actively used among lots of on-line users.

However, according to the conventional system, only service subscribers may share comments related to currently reproduced contents, and ordinary people who have not subscribed to a service cannot share comments.

SUMMARY OF THE INVENTION

To address the above-discussed deficiencies of the prior art, it is a primary object to provide at least the advantages described below. Accordingly, an aspect of the present disclosure is to provide an apparatus and a method for sharing a comment related to relevant contents regardless of service subscription in a mobile communication terminal.

Another aspect of the present disclosure is to provide an apparatus and a method for reading a comment Uniform Resource Locator (URL) from a metadata storage space of a currently reproduced contents file, storing a comment related to relevant contents in a comment server of the read comment URL or the metadata storage space, or reading a comment related to relevant comments from the comment server of the read comment URL or the metadata storage space and displaying the same.

In accordance with an aspect of the present disclosure, a method for sharing a comment in a mobile communication terminal is provided. The method includes receiving a comment regarding a contents file that is being reproduced, reading a comment Uniform Resource Locator (URL) from a metadata storage space of the contents file, and storing the comment regarding the received contents file in a storage space of the read comment URL.

In accordance with another aspect of the present disclosure, a method for sharing a comment in a mobile communication terminal is provided. The method includes reading a comment Uniform Resource Locator (URL) from a metadata storage space of a contents file that is being reproduced, reading a comment input in advance and stored with respect to the contents file from a storage space of the read comment URL, and displaying the read comment while reproducing the contents file.

In accordance with still another aspect of the present disclosure, a method for sharing a comment in a mobile communication terminal is provided. The method includes reading a comment Uniform Resource Locator (URL) from a metadata storage space of a contents file that is being reproduced, reading a comment input in advance and stored with respect to the contents file and information regarding a reproduction time and a reproduction scene of a relevant comment from a storage space of the read comment URL, displaying a comment list for each reproduction time on a screen based on the read comment and the read information regarding the reproduction time and the reproduction scene of the relevant comment, and when one comment is selected from the displayed comment list for each reproduction time, immediately connecting to a reproduction scene corresponding to the selected comment and reproducing the same.

In accordance with further another aspect of the present disclosure, an apparatus for sharing a comment in a mobile communication terminal is provided. The apparatus includes a memory for storing a contents file, a contents reproducer for reproducing the contents file, an input unit for receiving a comment regarding the contents file that is being reproduced, and a comment manager for reading a comment Uniform Resource Locator (URL) from a metadata storage space of the contents file, and storing the received comment regarding the contents file in a storage space of the read comment URL.

In accordance with yet another aspect of the present disclosure, an apparatus for sharing a comment in a mobile communication terminal is provided. The apparatus includes a memory for storing a contents file, a contents reproducer for reproducing the contents file, and a comment manager for reading a comment Uniform Resource Locator (URL) from a metadata storage space of a contents file that is being reproduced, reading a comment input in advance and stored with respect to the contents file from a storage space of the read comment URL, and displaying the read comment while reproducing the contents file.

In accordance with still further another aspect of the present disclosure, an apparatus for sharing a comment in a mobile communication terminal is provided. The apparatus includes a memory for storing a contents file, a contents reproducer for reproducing the contents file, and a comment manager for reading a comment Uniform Resource Locator (URL) from a metadata storage space of a contents file that is being reproduced, reading a comment input in advance and stored with respect to the contents file and information regarding a reproduction time and a reproduction scene of a relevant comment from a storage space of the read comment URL, displaying a comment list for each reproduction time on a screen based on the read comment and the read information regarding the reproduction time and the reproduction scene of the relevant comment, and when one comment is selected from the displayed comment list for each reproduction time, immediately connecting to a reproduction scene corresponding to the selected comment and reproducing the same.

Other aspects, advantages and salient features of the invention will become apparent to those skilled in the art from the following detailed description, which, taken in conjunction with the annexed drawings, discloses exemplary embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 7 illustrates a method for connecting to a reproduction scene corresponding to a contents-related comment in a mobile communication terminal according to the present disclosure.

Throughout the drawings, like reference numerals will be understood to refer to like parts, components and structures.

DETAILED DESCRIPTION OF THE INVENTION

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged mobile communication terminal. The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

Exemplary embodiments of the present disclosure provide an alternative for sharing a comment related to contents in a mobile communication terminal.

Figure 1:
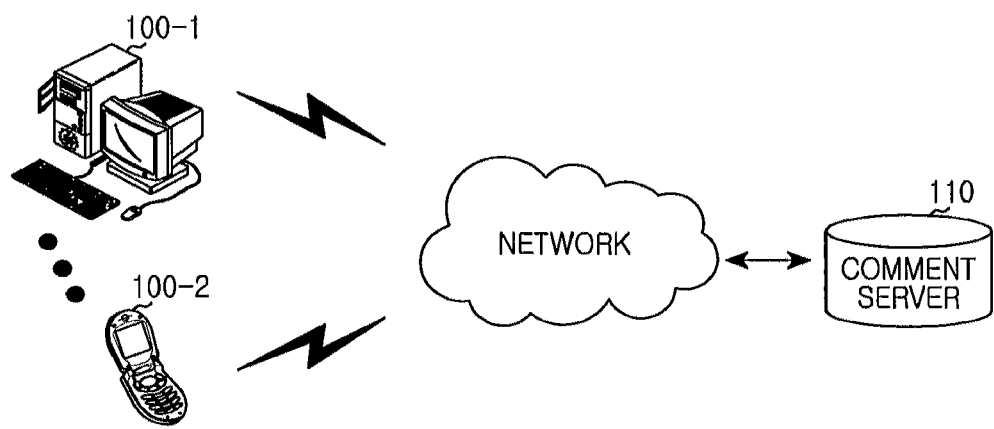
FIG. 1 illustrates a system for sharing a comment related to contents according to the present disclosure.

FIG. 1 illustrates a system for sharing a comment related to contents according to the present disclosure.

Referring to FIG. 1, the system for sharing a comment related to contents includes a plurality of terminals 100-1 and 100-2, and a comment server 110.

First, the comment server 110 stores and manages a comment input by users for respective contents. Here, the comment may have various forms, for example, a string form such as a tag and description, a sensing value form of various sensors (for example, a Global Positioning System (GPS), a thermometer, a direction sensor, etc.), an image file or a different contents file itself/or a link URL form, etc.

Each terminal 100-1 and 100-2 shares a comment related to relevant contents with other users by inputting and storing the comment related to the relevant contents, or by reading and displaying a comment input in advance and stored with respect to the relevant contents when reproducing a contents file. That is, the terminals 100-1 and 100-2 read a comment URL from a metadata storage space of a contents file that is currently being reproduced, store a comments related to relevant contents in the comment server 110 of the read comment URL or the metadata storage space, or read a comment related to relevant contents from the comment server 110 of the read comment URL or the metadata storage space, and display the same.

Figure 2:
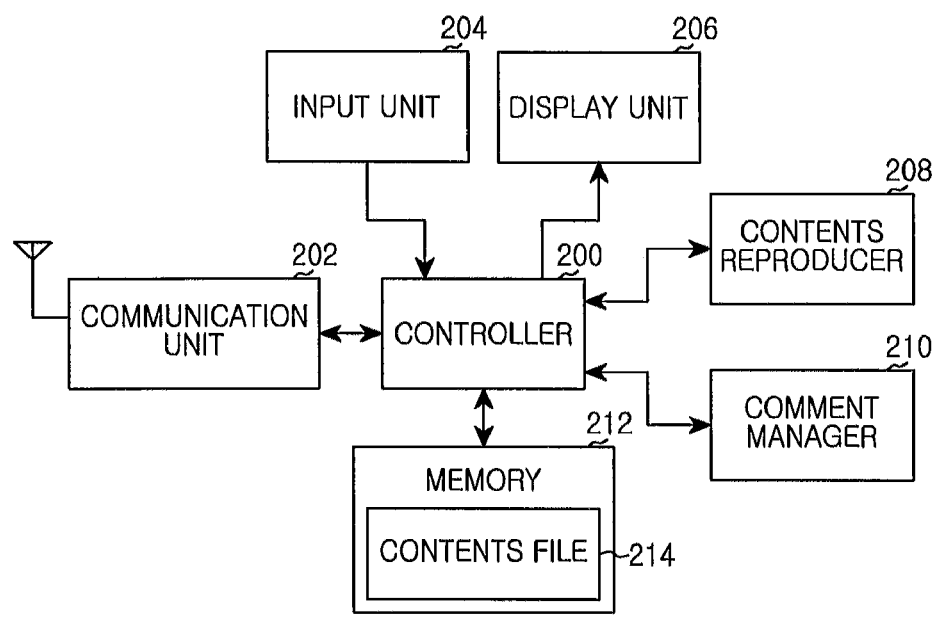
FIG. 2 illustrates a block diagram of an apparatus of a mobile communication terminal according to the present disclosure.

FIG. 2 illustrates a block diagram of an apparatus of a mobile communication terminal according to the present disclosure.

As illustrated, the terminal includes a controller 200, a communication unit 202, an input unit 204, a display unit 206, a contents reproducer 208, a comment manager 210, and a memory 212.

Referring to FIG. 2, the controller 200 controls an overall operation of the mobile communication terminal, and more particularly, processes a function for sharing a comment related to relevant contents regardless of service subscription according to an exemplary embodiment of the present disclosure.

The communication unit 202 transmits/receives a Radio Frequency (RF) signal input/output via an antenna. For example, during transmission, the communication unit 202 channel-codes and spreads data to be transmitted, and RF-processes a signal to transmit the same. During reception, the communication unit 202 despreads and channel-decodes a received RF signal to recover data.

The input unit 204 has a plurality of numerical key buttons and function key buttons, and provides key button input data corresponding to a key button pressed by a user to the controller 200.

The display unit 206 displays state information, a limited number of characters, a large amount of moving pictures and still pictures occurring during an operation of the mobile communication terminal.

The contents reproducer 208 reproduces a contents file 214.

The comment manager 210 reads a comment URL from a metadata storage space of the contents file 214 that is currently being reproduced, stores a comment related to relevant contents in a comment server of the read comment URL or the metadata storage space, or reads a comment related to relevant contents from the comment server of the read comment URL or the metadata storage space and displays the same.

The memory 212 stores microcodes of a program for processes and controls of the controller 200, various reference data, temporary data occurring during execution of various programs, and various updatable data for storage. More particularly, according to an exemplary embodiment of the present disclosure, the memory 212 stores a program for sharing a comment related to relevant contents regardless of service subscription. In addition, the memory 212 stores contents file 214.

Figure 3:
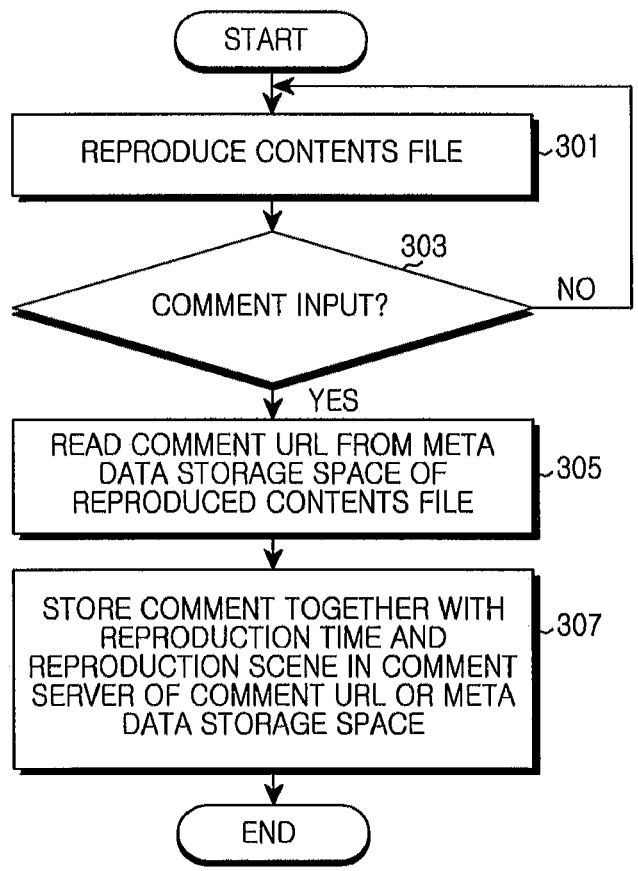
FIG. 3 illustrates a method for inputting and storing a comment related to contents in a mobile communication terminal according to the present disclosure.

FIG. 3 illustrates a method for inputting and storing a comment related to contents in a mobile communication terminal according to the present disclosure.

Referring to FIG. 3, the terminal reproduces a contents file in step 301.

The terminal determines whether a comment related to the contents file that is currently reproduced is input according to a user's key manipulation in step 303.

When determining that the comment related to the contents file that is currently reproduced is input according to the user's key manipulation in step 303, the terminal reads a comment URL from a metadata storage space of the contents file that is currently reproduced in step 305. Here, the comment URL is stored in the metadata storage space of the contents file in the form of metadata.

The terminal stores the input comment together with information regarding a current reproduction time and reproduction scene in a storage space of the read comment URL in step 307. Here, the storage space may be a comment server or the metadata storage space inside the contents file that is currently reproduced.

In contrast, when determining that the comment related to the contents file that is currently reproduced is not input according to the user's key manipulation in step 303, the terminal returns to step 301 to performs subsequent steps.

After that, the terminal ends the algorithm according to an exemplary embodiment of the present disclosure.

Figure 4:
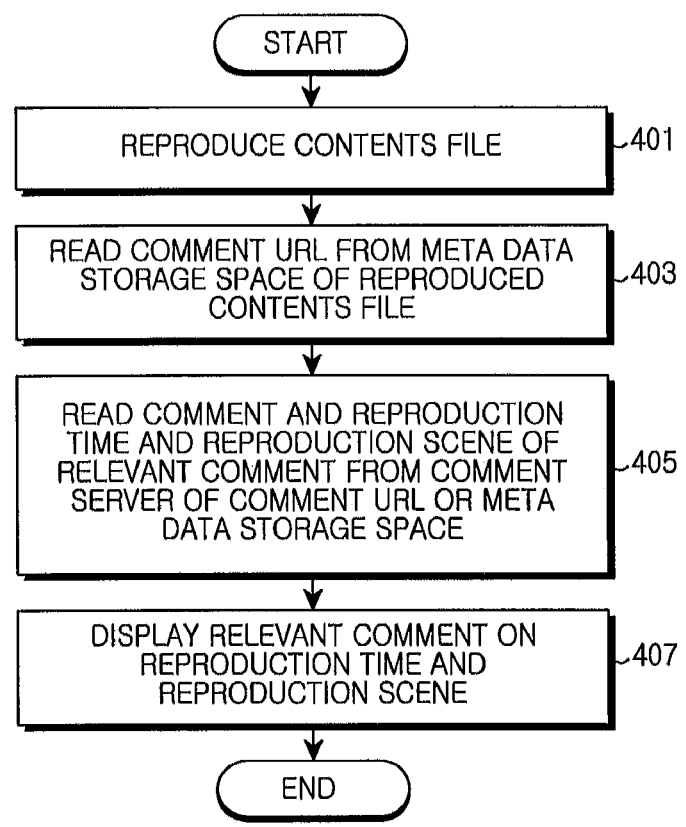
FIG. 4 illustrates a method for displaying a comment related to contents in a mobile communication terminal according to the present disclosure.

FIG. 4 illustrates a method for displaying a comment related to contents in a mobile communication terminal according to the present disclosure.

Referring to FIG. 4, the terminal reproduces a contents file in step 401.

The terminal reads a comment URL from a metadata storage space of a contents file that is currently reproduced in step 403. Here, the comment URL is stored in a metadata storage space of the contents file in the form of metadata.

The terminal reads a comment input in advance and stored with respect to the contents file, and information regarding a reproduction time and a reproduction scene stored together with the relevant comment from a storage space of the read comment URL in step 405. Here, the storage space may be a comment server or the metadata storage space inside the contents file that is currently reproduced.

The terminal displays a reproduction time where a comment exists and a relevant comment on a reproduction scene while reproducing the contents file based on the read comment and information regarding a reproduction time and a reproduction scene of a relevant comment in step 407.

After that, the terminal ends the algorithm according to an exemplary embodiment of the present disclosure.

Figure 5:
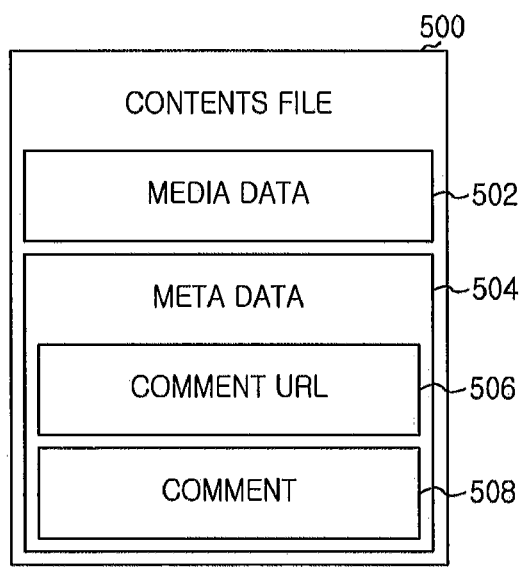
FIG. 5 illustrates a format of a contents file according to the present disclosure.

FIG. 5 illustrates a format of a contents file according to the present disclosure.

Referring to FIG. 5, the contents file 500 includes a storage space of media data 502 (that is, a video stream and an audio stream of an actual moving picture), and a storage space of metadata 504. The metadata 504 denotes the rest of information excluding the media data 502 and includes information required for reproducing the media data 502.

A comment URL 506 regarding a storage space in which a comment 508 is stored is stored in the storage space of the metadata 504 of the contents file. Here, the storage space in which the comment 508 is stored may be a storage space of the metadata 504 inside the contents file 500, or a comment server (not shown). For example, where the storage space in which the comment 508 is stored is the storage space of the metadata 504 inside the contents file 500 that is currently reproduced, as illustrated, not only the comment URL 506 but also the comment 508 is stored in the storage space of the metadata 504. In another example, where the storage space in which the comment 508 is stored is the comment server (not shown), the comment URL 506 is stored in the storage space of the metadata 504 and the comment 508 is stored in the comment server (not shown).

Here, as the storage space in which the comment 508 is stored, one of the storage space of the metadata 504 inside the contents file 500 that is currently reproduced and the comment server (not shown) may be used, and both the two storage spaces may be used. In this example, when a network access is swift, a comment is stored in both the two storage spaces. When the network access is not swift, a comment 508 is stored first in the storage space of the metadata 504 inside the contents file 500 that is currently reproduced, and then when the network access becomes swift afterward, a relevant comment may be stored in the comment server (not shown).

Figure 6:
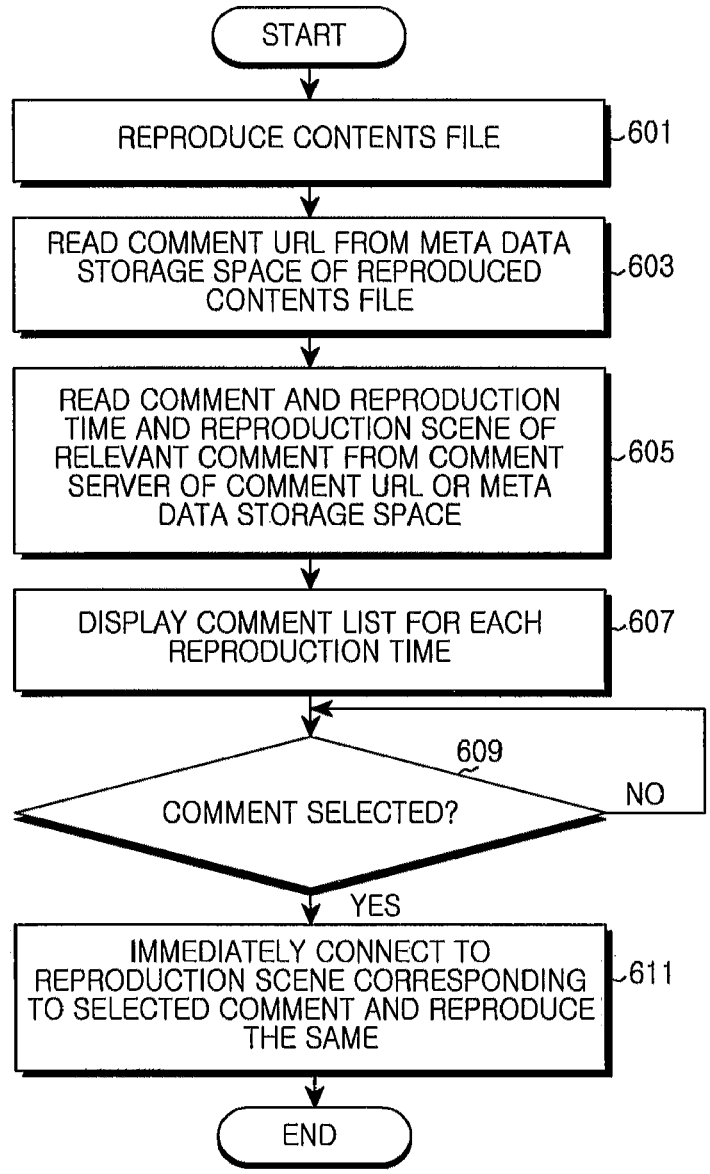
FIG. 6 illustrates a method for connecting to a reproduction scene corresponding to a contents-related comment in a mobile communication terminal according to the present disclosure.

FIG. 6 illustrates a method for immediately connecting to a reproduction scene corresponding to a contents-related comment in a mobile communication terminal according to the present disclosure.

Referring to FIG. 6, the terminal reproduces a contents file in step 601.

The terminal reads a comment URL from a metadata storage space of a contents file that is currently reproduced in step 603. Here, the comment URL is stored in the form of metadata in a metadata storage space of a relevant contents file.

The terminal reads a comment input in advance and stored with respect to the contents file, and information regarding a reproduction time and a reproduction scene stored together with the relevant comment from a storage space of the read comment URL in step 605. Here, the storage space may be a comment server, or a metadata storage space of a contents file that is currently reproduced.

The terminal displays a comment list for each reproduction time based on the read comment and the information regarding a reproduction time and a reproduction scene of the relevant comment in step 607.

The terminal determines whether one comment is selected from the displayed comment list for each reproduction time in step 609.

When determining that one comment is selected from the displayed comment list for each reproduction time in step

609, the terminal immediately connects to a reproduction scene corresponding to the selected comment and reproduces the same in step 611.

For example, with respect to a contents file titled "secret garden", a comment list for each reproduction time may be displayed on a screen as in FIG. 7. That is, with respect to a reproduction scene of a reproduction time "00:02:11", a first comment of "Hyunbin's home", a second comment of "luxury house", and a third comment of "very beautiful" input in advance and stored may be displayed on a screen. In addition, with respect to a reproduction scene of a reproduction time "00:10:11", a fourth comment of "HA, Ji-won's home" and a fifth comment of "rooftop house!" input in advance and stored may be displayed on the screen. In addition, with respect to a reproduction scene of a reproduction time "00:20:11", a sixth comment of "Hyunbin' car, BMW" and a seventh comment of "open car is chilly" input in advance and stored may be displayed on the screen. Among them, when the third comment of "very beautiful" input in advance and stored with respect to the reproduction scene of the reproduction time "00:02:11" is selected, the terminal may immediately connect to a reproduction scene corresponding to the selected third comment and reproduce the same.

After that, the terminal ends the algorithm according to an exemplary embodiment of the present disclosure.

As described above, users may form consensus via sharing of a comment with respect to contents according to an exemplary embodiment of the present disclosure. In addition, users may recommend relevant contents or other contents related to a comment via the comment for people forming consensus similar to those of the users. Accordingly, the users may induce consumption of other contents while continuing to maintain consensus between users.

Meanwhile, when reproducing a contents file, the terminal drives a sensor (for example, a GPS, a thermometer, a direction sensor, etc.) to obtain a sensing value, and may store the sensing value (for example, a position value, a temperature value, a direction value, etc.) in the comment server or a metadata storage space inside the contents file that is currently reproduced as a comment. For example, a user may reproduce contents suitable for a travel area or a travel atmosphere during a travel, and store environment information (for example, a position value, a temperature value, a direction value, etc.) for a travel destination as a comment. Accordingly, users who have shared the relevant comment may receive useful information while the users travel or when the users use the relevant contents.

Exemplary embodiments of the present disclosure provide an advantage of sharing a comment related to relevant contents when only a contents file that is currently reproduced exists regardless of service subscription by reading a comment URL from a metadata storage space of the contents file that is currently reproduced, storing the comment related to the relevant comments in a comment server of the read comment URL or the metadata storage space, or reading the comment related to the relevant contents from the comment server of the read comment URL or the metadata storage space and displaying the same in a mobile communication terminal. Accordingly, a user may share a comment with more users so that the user may form consensus with various people. In addition, even when a change in contents occurs (for example, a change in the title or other metadata of the contents occurs), when only a contents file that is currently reproduced exists, a link between the contents and a comment share service may be maintained without disconnection.

Although the invention has been shown and described with reference to certain exemplary embodiments thereof, it will be understood by those skilled in the art that various changes in form and details may be made therein without departing from the spirit and scope of the invention as defined by the appended claims and their equivalents. Therefore, the scope of the present invention should not be limited to the above-described embodiments but should be determined by not only the appended claims but also the equivalents thereof.

What is claimed is:

1. A method for sharing a comment in a mobile communication terminal, the method comprising:
   receiving a plurality of comments regarding a content file that is being reproduced;
   reading a comment Uniform Resource Locator (URL) from a meta data storage space of the content file;
   storing the plurality of comments regarding the content file along with information regarding a plurality of reproduction times of the content file, each reproduction time in which a corresponding comment was entered; and
   generating the plurality of comments with respective reproduction times in a second window, and an image of the content file in a first window, for display on a screen,
   wherein one of the plurality of comments in the second window is selected, the content file is reproduced in the first window from a reproduction time in which the selected comment was entered.

2. The method of claim 1, wherein the storage space comprises at least one of a comment server and the metadata storage space of the content file.

3. The method of claim 1, wherein the comment is stored together with information regarding a current reproduction scene.

4. The method of claim 1, wherein the comment has at least one form of a string, a sensing value, an image file, a content file, a link URL of the image file, and a link URL of the content file.

5. The method of claim 1, further comprising:
   reading a comment input in advance and stored with respect to the content file;
   reading information regarding a reproduction time and a reproduction scene of a relevant comment from the storage space of the comment URL; and
   displaying a relevant comment on a reproduction time and a reproduction scene where a comment exists while reproducing the content file based on the comment input in advance and the information regarding the reproduction time and the reproduction scene of the relevant comment.

6. The method of claim 1, further comprising:
   reading a comment input in advance and stored with respect to the content file;
   reading information regarding a reproduction time and a reproduction scene of a relevant comment from the storage space of the comment URL;
   displaying a comment list for each reproduction time based on the comment input in advance and the information regarding the reproduction time and the reproduction scene of the relevant comment; and
   in response to a comment being selected from the comment list for each reproduction time, connecting to a reproduction scene corresponding to the comment selected and reproducing the reproduction scene.

7. A method for sharing a comment in a mobile communication terminal, the method comprising:
   reading a comment Uniform Resource Locator (URL) from a metadata storage space of a content file;

reading a plurality of comment inputs stored with respect to the content file, and information regarding a plurality of reproduction times of the content file, each reproduction time in which a corresponding comment input is entered from a storage space of the comment URL; and generating the plurality of comment inputs with information regarding the plurality of reproduction times of the content file, each production time in which respective corresponding comment input was entered, in a second window, and an image of the content file in a first window, for display on a screen, wherein one of the comment inputs displayed in the second window is selected, the content file is reproduced in the first window from a point of a reproduction time in which the selected comment input was entered.

8. The method of claim 7, wherein the storage space comprises at least one of a comment server and the metadata storage space of the content file.

9. A method for sharing a comment in a mobile communication terminal, the method comprising:

reading a comment Uniform Resource Locator (URL) from a metadata storage space of a content file that is being reproduced;

reading a plurality of comment inputs previously stored with respect to the content file, and a plurality of reproduction times in which respective comment inputs are entered;

reading information regarding a reproduction time and a reproduction scene of a relevant comment from a storage space of the comment URL;

generating the plurality of comment inputs along with the respective reproduction times in a second window, and an image of the content file in a first window, for display on a screen; and in response to selecting a comment input from the plurality of comment inputs, reproducing the content file from a reproduction time in which the selected comment was entered, in the first window, wherein the comment inputs are stored along with information regarding the respective reproduction times of the content file, each reproduction time in which a corresponding comment input was entered.

10. The method of claim 9, wherein the storage space comprises at least one of a comment server and the metadata storage space of the content file.

11. An apparatus for sharing a comment, the apparatus comprising:

a memory configured to store a content file;

a content reproducer configured to reproduce the content file;

an input unit configured to receive a plurality of comments regarding the content file that is being reproduced; and a comment manager configured to:

read a comment Uniform Resource Locator (URL) from a metadata storage space of the content file; and store the plurality of comments regarding the content file in a storage along with information regarding a plurality of reproduction times of the content file, each reproduction time in which a corresponding comment was entered; and generate the plurality of comments along with respective reproduction times in a second window and an image of the content file in a first window, for display on a screen, wherein one of the plurality of comments in the second window is selected, the content file is reproduced in the first window from a reproduction time in which the selected comment was entered.

12. The apparatus of claim 11, wherein the storage space comprises at least one of a comment server and the metadata storage space of the content file.

13. The apparatus of claim 11, wherein the comment is stored together with information regarding a current reproduction scene.

14. The apparatus of claim 11, wherein the comment has at least one form of a string, a sensing value, an image file, a content file, a link URL of the image file, and a link URL of the content file.

15. The apparatus of claim 11, wherein the comment manager is further configured to read a comment input in advance and stored with respect to the content file, read information regarding a reproduction time and a reproduction scene of a relevant comment from the storage space of the comment URL, and display a relevant comment on a reproduction time and a reproduction scene where a comment exists while reproducing the content file based on the comment input in advance and the information regarding the reproduction time and the reproduction scene of the relevant comment.

16. The apparatus of claim 11, wherein the comment manager is further configured to:

read a comment input in advance and stored with respect to the content file, and information regarding a reproduction time, read a reproduction scene of a relevant comment from the storage space of the comment URL, display a comment list for each reproduction time based on the comment input in advance and the information regarding the reproduction time and the reproduction scene of the relevant comment, and connect, in response to a comment being selected from the comment list for each reproduction time, to a reproduction scene corresponding to the comment selected and reproduce the reproduction scene.

17. An apparatus for sharing a comment in a mobile communication terminal, the apparatus comprising:

a memory configured to store a content file;

a content reproducer configured to reproduce the content file; and a comment manager configured to:

read a comment Uniform Resource Locator (URL) from a metadata storage space of a content file, read a plurality of comment inputs stored with respect to the content file, and information regarding a plurality of reproduction times of the content file, each reproduction time in which a corresponding comment input is entered from a storage space of the comment URL, and generate the plurality of comment inputs with information regarding a plurality of reproduction times of the content file, each production time in which respective corresponding comments are entered, in a second window, and an image of the content file in a first window, for display on a screen, wherein one of the comments displayed in the second window is selected, the content file is reproduced in the first window from a point of a reproduction time in which the selected comment was stored.

18. The apparatus of claim 17, wherein the storage space comprises at least one of a comment server and the metadata storage space of the content file.

19. An apparatus for sharing a comment, the apparatus comprising:
  a memory configured to store a content file;
  a content reproducer configured to reproduce the content file; and
  a comment manager configured to:
    read a comment Uniform Resource Locator (URL) from a metadata storage space of a content file that is being reproduced,
    read a plurality of comment inputs previously stored with respect to the content file, and a plurality of reproduction times in which respective comment inputs are entered;
    read information regarding a reproduction time and a reproduction scene of a relevant comment from a storage space of the comment URL,
    generate the plurality of comment inputs along with the respective reproduction times in a second window, and an image of the content file in a first window, for display on a screen, and
    in response to selecting a comment input from the plurality of comment inputs, reproducing the content file in the first window from a reproduction time in which the selected comment was entered,
  wherein the comment inputs are stored along with information regarding the respective reproduction times of the content file, each reproduction time in which a corresponding comment input was entered.

20. The apparatus of claim 19, wherein the storage space comprises at least one of a comment server and the metadata storage space of the content file.

* * * * *